United States Patent [19]
Suhayda

[11] Patent Number: 5,178,489
[45] Date of Patent: Jan. 12, 1993

[54] HYDRODYNAMIC CONTROL SYSTEM

[76] Inventor: Joseph Suhayda, 285 Sunset Blvd., Baton Rouge, La. 70808

[21] Appl. No.: 831,415

[22] Filed: Feb. 5, 1992

[51] Int. Cl.$^5$ .............................................. E02B 3/06
[52] U.S. Cl. ...................................... 405/21; 405/16; 405/34; 405/258; 405/284
[58] Field of Search ............... 405/21, 15, 16, 30, 405/31, 34, 258, 284, 285, 286; 256/1, 13.1; 404/82, 31, 32

[56] References Cited

U.S. PATENT DOCUMENTS

| | | | |
|---|---|---|---|
| 3,487,645 | 1/1970 | Frankel . | |
| 3,764,446 | 10/1973 | Martin | 405/16 X |
| 3,934,540 | 1/1976 | Bruner et al. | 116/63 P |
| 4,022,434 | 5/1977 | Moore | 256/1 |
| 4,080,793 | 3/1978 | Pulsifer . | |
| 4,139,319 | 2/1979 | Anderson | 405/16 |
| 4,142,821 | 3/1979 | Doring | 405/258 |
| 4,186,913 | 2/1980 | Bruner et al. | 256/13.1 |
| 4,196,694 | 4/1980 | Buchanan | 119/3 |
| 4,900,188 | 2/1990 | Haselton et al. | 405/27 |
| 4,997,309 | 3/1991 | Kiselewski | 405/16 |
| 5,011,327 | 4/1991 | Thiac | 405/28 |

FOREIGN PATENT DOCUMENTS

| | | | |
|---|---|---|---|
| 0009924 | 1/1980 | Japan | 405/16 |
| 0859531 | 9/1981 | U.S.S.R. | 405/115 |
| 1357487 | 12/1987 | U.S.S.R. | 405/21 |
| 183615 | 8/1922 | United Kingdom | 405/16 |

*Primary Examiner*—Dennis L. Taylor
*Attorney, Agent, or Firm*—C. Emmett Pugh

[57] ABSTRACT

A barrier system utilizing a plurality of waste tires arranged to control hydrodynamic processes, diminishing the amplitude of waves and controlling sediment migration in bodies of water, in order to prevent shore damage, erosion or the like, while promoting restoration of same. The barrier typically includes a plurality of transversely stacked tires or the like pivotally affixed to a side, anchoring member configured to slidingly communicate with a support column embedded in the sea floor, either in orthogonal or angled fashion, depending upon the conditions and desired effect. The side members may be configured to allow two distinct, side support, hinge-like areas to independently engage with the support column, forming a wall. The present device as installed diminishes wave amplitude by absorbing the rotational movement of the affixed tires about the column. A number of diverse geometries, all designed for various specific applications and environs, utilizing the mounting system of the present invention, is disclosed. The mounting system includes a diverse link arrangement wherein each tire has provided in its radial cavity a spacer configured to communicate via a bolt or the like typically with the side member exterior to the tire, which is in turn slidingly communicating with the anchoring column. The barrier arrangement provides a safe, economical, and effective system for diminishing water action damage, while utilizing an often otherwise un-recyclable resource, namely, waste tires.

48 Claims, 14 Drawing Sheets

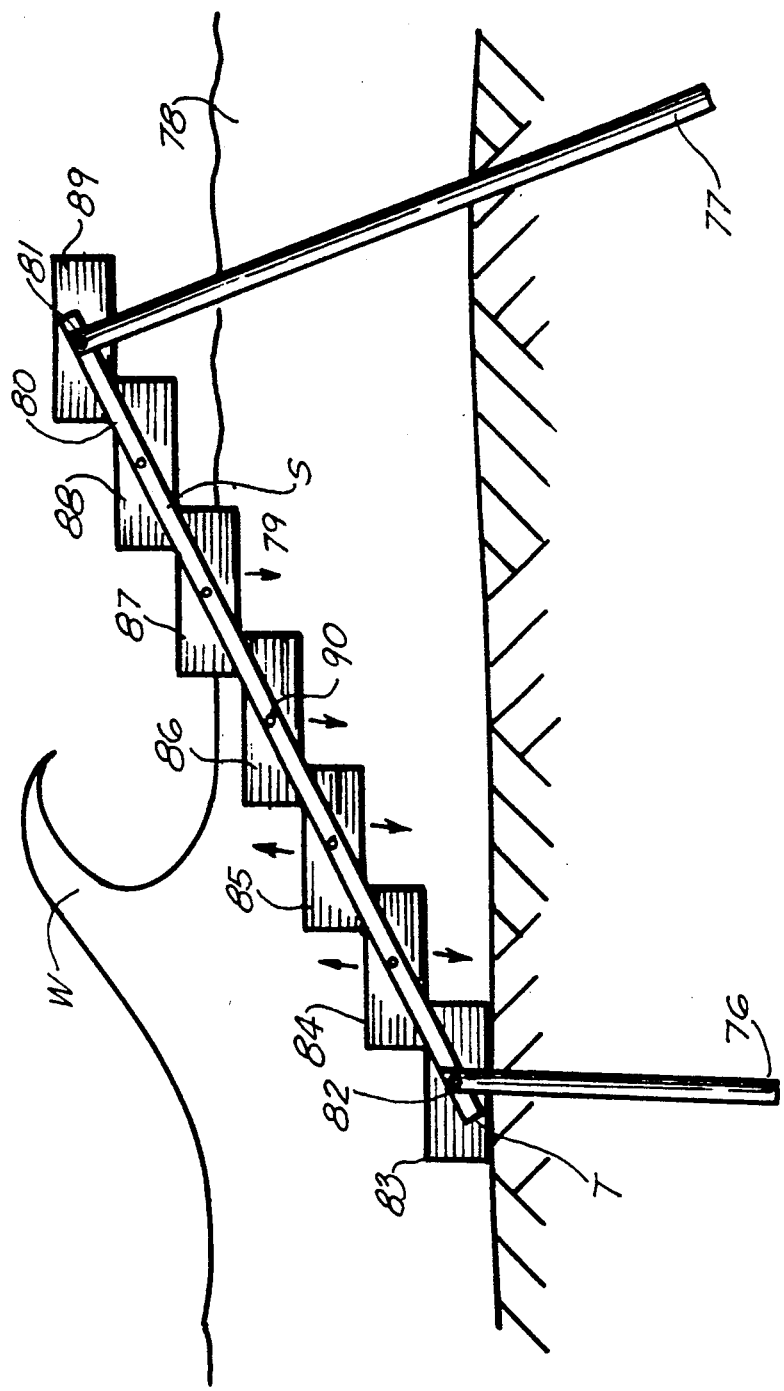

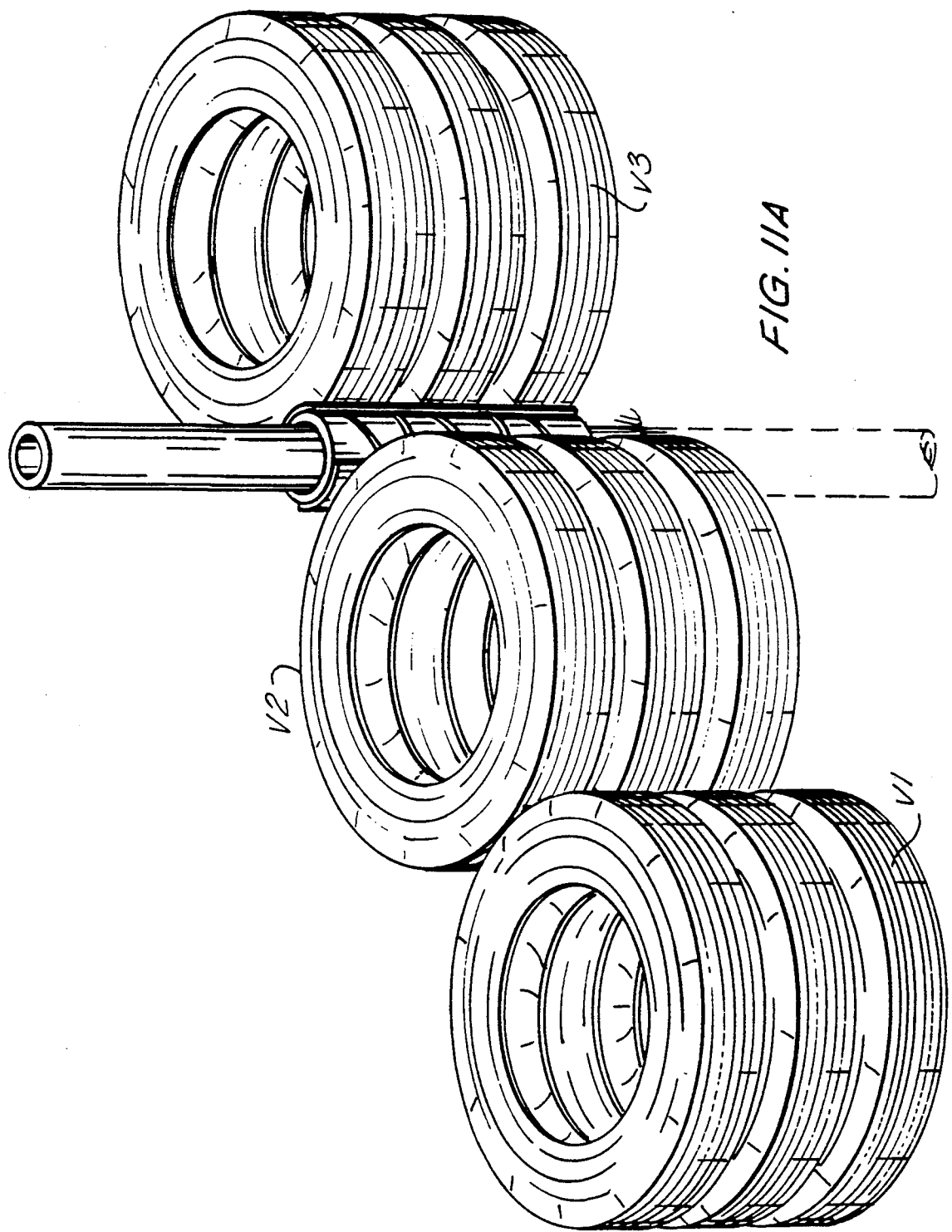
FIG. IIA

HYDRODYNAMIC CONTROL SYSTEM

BACKGROUND OF INVENTION

1. Field of Invention

The present invention relates to erosion control systems, and more particularly to a system utilizing a plurality of interconnected but relatively moveable, waste tires arranged to control hydrodynamic processes, diminishing the amplitude of wave and controlling sediment migration in bodies of water, such that shore damage, erosion or the like is prevented, while promoting restoration of same. The hydrodynamic processes involved may include water level variations, surface wave action, currents, mixing and sediment transport.

The present device as taught in the invention may be configured and implemented to prevent or reduce saltwater intrusion in canals or channels, reduce and attenuate surface wave action, thereby preventing erosion and accompanying increased water turbidity, contain and impound dredge spoil and submerged sediment effluent, trap sediment to protect pipelines and shorelines, and redirect the natural flows in natural water bodies and man-made channels.

The preferred, exemplary embodiment of the present invention teaches a barrier arrangement wherein there is provided a plurality of transversely stacked tires or the like pivotally affixed to a side member, which is configured to slidingly communicate with a support column embedded in the sea floor, either in an orthogonal or angled fashion, depending upon the conditions and desired effect.

The exemplary embodiment further contemplates and teaches an arrangement wherein the side members may be configured so as to allow distal side engaging members to independently engage with the tires forming the support columns, forming a wall.

The present device as installed diminishes wave amplitude by absorbing the movement of the affixed tires about the column.

The present invention contemplates a number of diverse geometries, all designed for various specific applications and environs, utilizing the mounting system of the present invention.

The mounting system of the present invention contemplates a diverse link arrangement wherein each tire has provided in its radial cavity a spacer. The spacer is configured to communicate via bolt or the like with the side member exterior the tire, which is in turn slidingly communicates dynamic connector communicating with the lateral column.

The present arrangement as contemplated provides a safe, economical and effective system for diminishing water action damage, while utilizing an often otherwise un-recyclable resource, namely, waste tires.

2. Prior Art & General Background

While there exists a plethora of prior patents teaching revetments and erosion control arrangements of various configurations, many as detailed below utilizing waste tires therewith, none teach or contemplate the flexible, easily installed, effective, and relatively inexpensive system of the present invention.

The prior art has failed to provide a diverse system for stemming damage caused by hydrodynamic process, one of the most serious and costly problems affecting industrialized societies today, and greatly contributing to today's deteriorated environment. Solutions to this problem are being sought in two forms, namely, (1) prevention of further deterioration; and (2) remediation and restoration of the environment.

The problem becomes particularly acute in the hydrosphere, that is, in water bodies found in the environment. Water bodies, whether natural or man-made, are the locations of major industrial activities and population centers, a variety of recreational activities, a wide range of commercial fisheries and extensive transportation routes and facilities.

Unfortunately, these same areas are the locations of serious environmental problems, such as the pollution of rivers and estuaries, pollution of submerged sediments, oil spills, coastal erosion, wetland loss, non-point source pollution, saltwater intrusion and increased flooding.

What makes solving environmental problems in water bodies so difficult is that the sites are less accessible than on land and that the problem can exist over much larger geographic areas.

All of the environmental problems associated with water bodies are directly affected, if not actually controlled, by the hydrodynamic processes occurring within that water body. It is the hydrodynamic processes of waves, currents, water level variations, mixing and sediment transport that move pollutants, erode and deposit sediments, cause floods and apply excessive forces to man-made structures.

In trying to solve environmental problems in water bodies, what is needed is technology which deals directly with the hydrodynamic processes involved and which can modify these processes in beneficial ways. Few such hydrodynamic control devices are available today, and those that are available, such as breakwaters, river training works, groins and weirs, are expensive to construct, require continuous maintenance, and are limited in their scope of applications.

Another problem that exists today within the environment is the widespread occurrence of discarded used automobile tires. Discarded tires are found throughout the nation in numbers that are staggering. Approximately one tire is discarded per year per person in the United States, amounting to about 2000,000,000 tires added each year to this growing mass. Discarded tires are unsightly, constitute a fire hazard, provide a breeding ground for mosquitos and other insects, and are usually illegally dumped without the property owners' permission.

New regulations are being implemented which prevent used tires from being placed in landfills, and special fees are being levied on the purchase of new tires to generate funds for developing options for tire recycling.

A list of prior patents which may be of interest is presented below:

| Pat. No. | Patentee(s) | Issue Date |
| --- | --- | --- |
| 3,487,645 | Frankel | 01/06/1970 |
| 3,934,540 | Brunner et al | 01/27/1976 |
| 4,022,434 | Moore | 05/10/1977 |
| 4,080,793 | Pulsifer | 03/28/1978 |
| 4,139,319 | Anderson | 02/13/1979 |
| 4,142,821 | Doring | 03/06/1979 |
| 4,186,913 | Brunner et al | 02/05/1980 |
| 4,196,694 | Buchanan | 04/08/1980 |
| 4,900,188 | Haselton et al | 02/13/1990 |
| 4,997,309 | Kiselewski | 03/05/1991 |
| 5,011,327 | Thiac | 04/30/1991 |

As may be discerned by a review of the above patents, the prior art does not teach nor suggest a barrier wall system like the present invention comprising a plurality of transversely stacked tires slidingly linked to a support column.

Further, there does not appear to be any patents which disclose the use of the combined mass provided by the water tire members in a configuration for diminishing or dampening wave amplitude via their movement about a lateral, vertical or angled axis.

For example, Pat. No. 3,487,645 issued in 1970 describes a "wave dampening device", wherein a buoyant member supported via a flexible cable configuration is used to allow communication with passing waves, dampening the wave amplitude through its absorption of wave energy and movement resulting therein.

U.S. Pat. No. 4,022,434 issued in 1977 and U.S. Pat. No. 4,142,821 issued in 1979 disclose the use of a plurality of waste tires affixed to one another at their peripheries with rivets or nut and bolt arrangements to form an electric fence and erosion control mat, respectively.

U.S. Pat. No. 4,080,793 issued in 1978 is directed to a "Method and Apparatus for Using Automotive Tires as Earth Engineering Devices," wherein there is taught various alternative embodiments involving a plurality of tires, affixed at their peripheries via fasteners, to form three dimensional structures suitable for reinforcing earthen structures, such as dams, revetments, levees and the like.

Finally, U.S. Pat. No. 5,011,327 issued in 1991 describes an "Erosion Barrier" wherein there is provided a first tire barrier comprising a plurality of stacked, static tiers of tires cut in half and positioned to form a barrier/breaker wall, wherein the uncut, intact, outer tread side of the tire wall communicates with the incoming tide, and the open, parabolic, inner side of the tire wall communicates with the outgoing tide, collecting alluvium and preferably preventing or slowing erosion. The various tires comprising the wall are directly connected to one another in a rigid fashion, via nut and bolt connectors, including a spacer (22) (FIG. 6) for maintaining the open side of the tires of the wall in their open position.

3. General, Summary Discussion of the Invention

While the prior art fails to achieve an easily implemented, relatively inexpensive and effective hydrodynamic control system, the present invention overcomes the prior art problems denoted above.

This invention provides a practical and cost effective method for addressing here-to-fore unsolved environmental problems associated with the control, alteration and modification of hydrodynamic processes, as well as providing for recycling of used automobile tires.

Both the device and method of the present invention are based upon constructing a structure or structures of interconnected whole tires and functionally locating these structures at critical locations in water bodies.

The structures are designed to take advantage of the shape and mechanical properties of the individual tires. The structures are anchored by piles to the water body bottom or are suspended or partially suspended in the water column. The structures can be moved or removed to take advantage of changing conditions. The structural arrangement of the tires is in the form of mats, curtains, columns and/or blocks, as dictated by the particular application.

The tires are connected using bolts and specially designed and fabricated interlocks and connectors. The structures may contain weighted and/or buoyant elements, as needed.

The operation of the hydrodynamic control devices is based upon the fact that individual tires cause localized changes in the water mean flow and the turbulence intensity, and that these single tire effects can be integrated into multi-component structures which accomplish major modification of hydrodynamic processes.

The effect of an individual tire is to divert the mean flow around the tire and, through flow separation and fluid drag, cause increased turbulence in the downstream direction. By spacing and orienting individual tires in one, two and three dimensional arrays, flow diversion and turbulence generation by one tire can be constructively or destructively combined with another, as needed.

The design of a particular tire array is constrained by the function it is to perform, i.e. wave attenuation, current diversion, etc., and by the specific characteristics of the site of operation.

The invention takes maximum advantage of the inherent mechanical properties of vehicular tires. Typically, such vehicular tires are toroidally configured sheets of rubber, banded along the inside edge of the sheet with steel cable (the "bead" of the tire) and wrapped around the outside flat surface with steel or fiberglass bands (the tire "belts"). The tires are quite flexible in tension and compression and in torsion up to a limit, at which point the tire becomes nearly inflexible.

The invention teaches how to use, for example, bolts and plastic materials to make connections between tires that provide the strengths necessary to construct massive, dynamic structures which will resist the applied forces. Furthermore, the invention teaches how to connect tires into geometric arrays or structures that are suitable for accomplishing a particular hydrodynamic control function at a particular site.

It is therefore an object of the present invention to teach a system for utilizing or otherwise recycling used vehicular tires and the like, such that the tires may be utilized to form a hydrodynamic control system, thereby converting a societal liability into an asset.

It is another object of the present invention to provide a hydrodynamic control system which utilizes materials which are environmentally safe and non-degradable.

It is another object of the present invention to provide a hydrodynamic control structure, comprising an array formed from a plurality of tires, wherein the structure is designed to pose no threat to human safety and have minimal impact on water body use and aesthetics.

It is yet another object of the present invention to provide a hydrodynamic control system which, as configured, fills an existing gap in engineering technology for controlling hydrodynamic processes.

It is still another object of the present invention to provide a hydrodynamic control system which can be constructed with hand tools at minimal cost.

It is another object of the present invention to provide a hydrodynamic control system which can be easily installed preferably without heavy machinery or equipment.

Lastly, it is an object of the present invention to provide a hydrodynamic control system which may be adjusted to accommodate varying environmental force and soil conditions.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 3 is a side, partially cutaway view of another alternative embodiment of the hydrodynamic control system of the invention, illustrating an exemplary design configuration for reducing the effective height of high wave action.

FIG. 11A is a perspective view of a first, exemplary, "3×3" tire module, which may be made off-site, having the hinge-like inter-connector of FIGS. 8 and 9a & 9b between the central column or tire stack and one of the outboard tire columns (right-most one), and the tread face to tread face interconnection of FIG. 7a between the tires of the central column and the opposed tires of the other, left-most outboard column; while

Figure 11B:
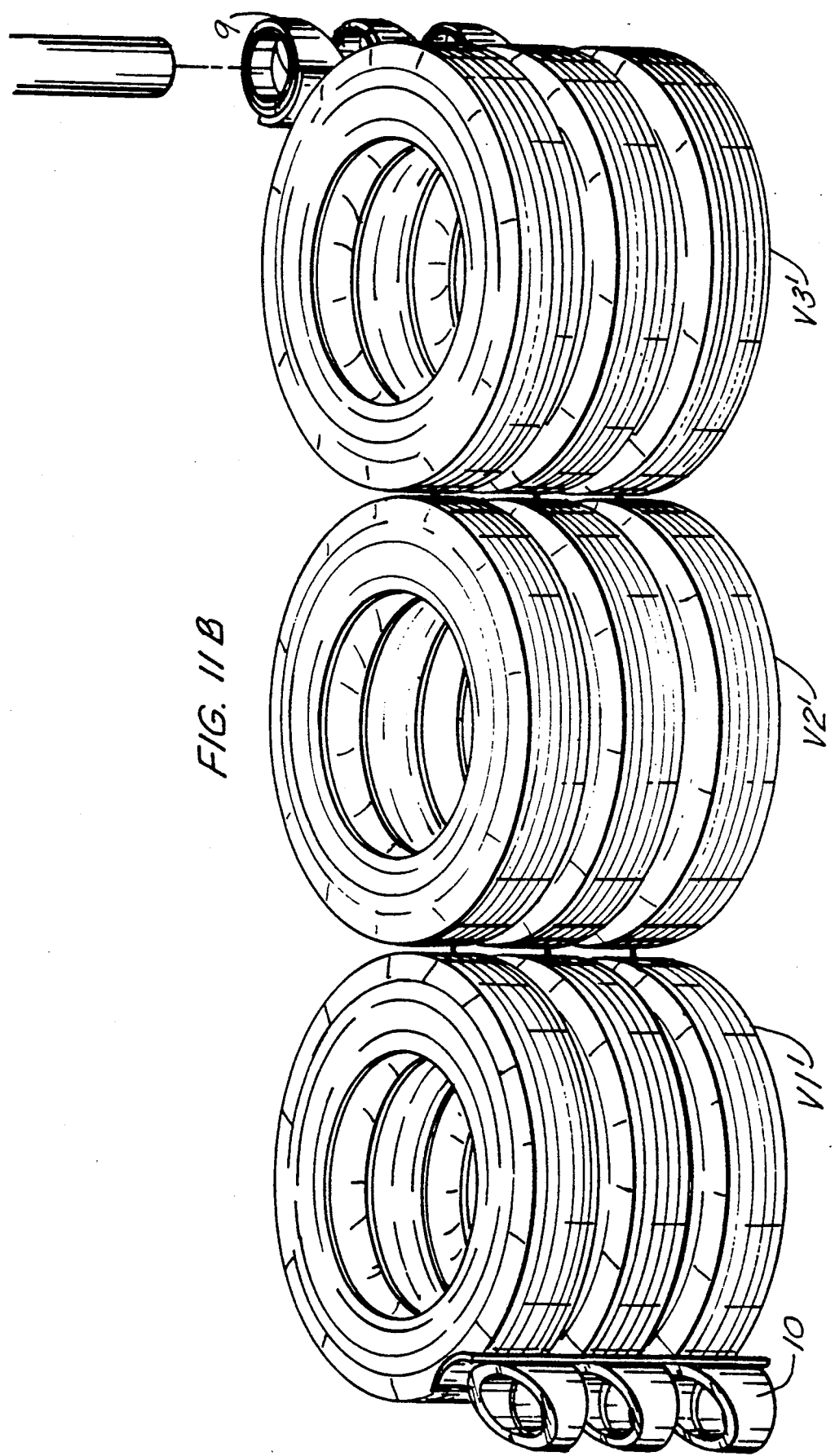
FIG. 11B is a perspective view of a second, exemplary, "3×3" tire module, which may be made off-site for ultimate use on site in the embodiments of FIGS. 1a–c and FIGS. 1a & 2b, with the module having the dynamic support members of the hinge-like interconnector of FIGS. 8 and 9a & 9b separated and located on opposite, outboard ends of the module for mating with oppositely configured "hinge" members on other modules or individual elements, and with the tread face to tread face interconnection of FIG. 7a being used between the tires of the central column and the opposed tires of the other two, outboard columns.

[It is noted that the informal drawing for FIG. 11B filed with this application shows the hinge sections 9 & 10 out of alignment off of the ends of the module, while in reality the hinge sections 9 & 10 fall in line with the vertical center-lines of the three tire stacks. It is applicant's intention to have this corrected when formal drawings are filed, at which time this paragraph will be deleted from the specification.]

Figure 12:
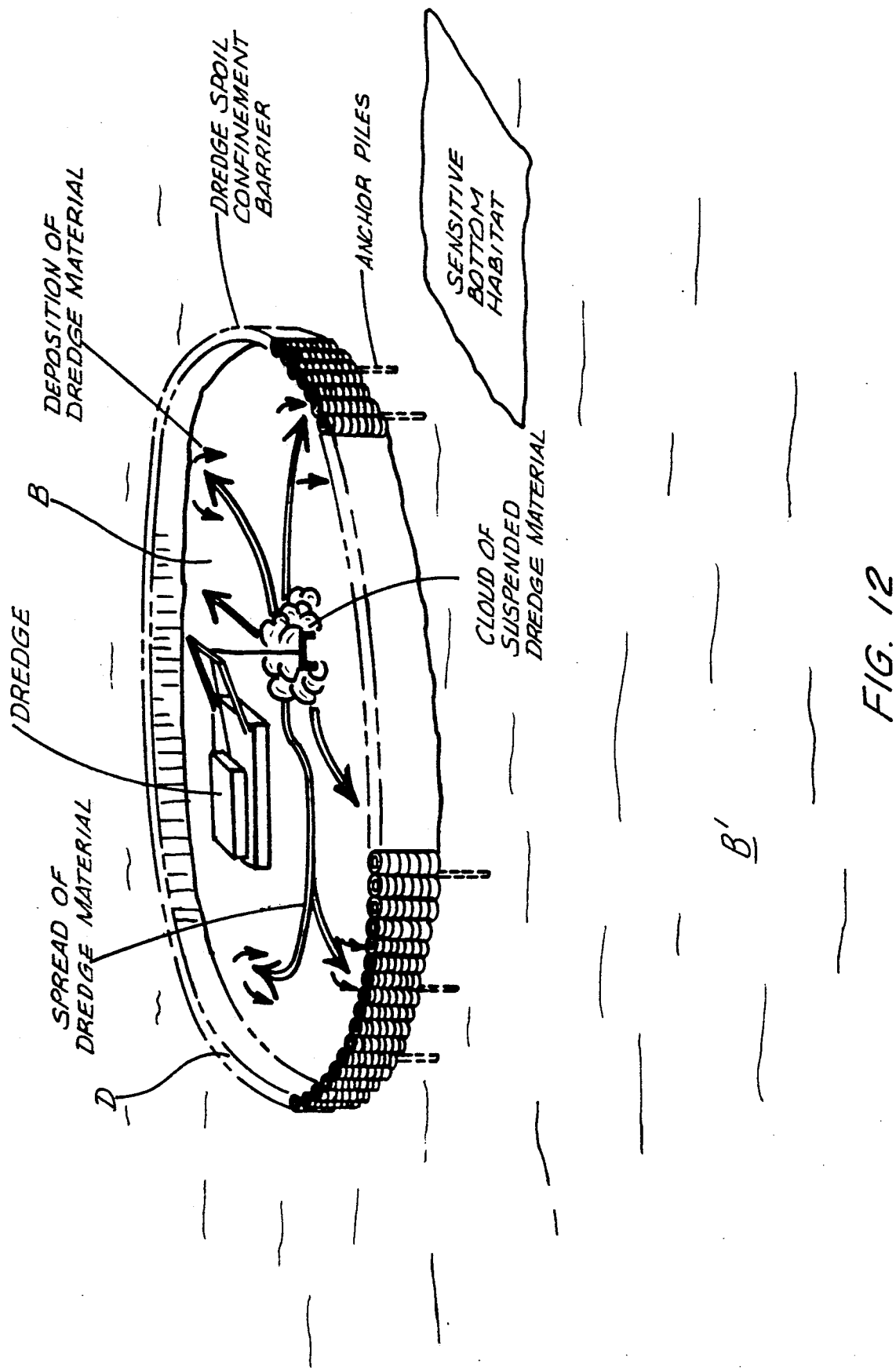

FIG. 12 is an illustration of an alternative embodiment of the invention of FIG. 1, wherein there is illustrated the encircling of a sediment source with a flexible dam structure to prevent the migration of sediment or the like from a minor body of water to a major body of water.

DETAILED DESCRIPTION OF THE PREFERRED, EXEMPLARY EMBODIMENTS

Figure 8:
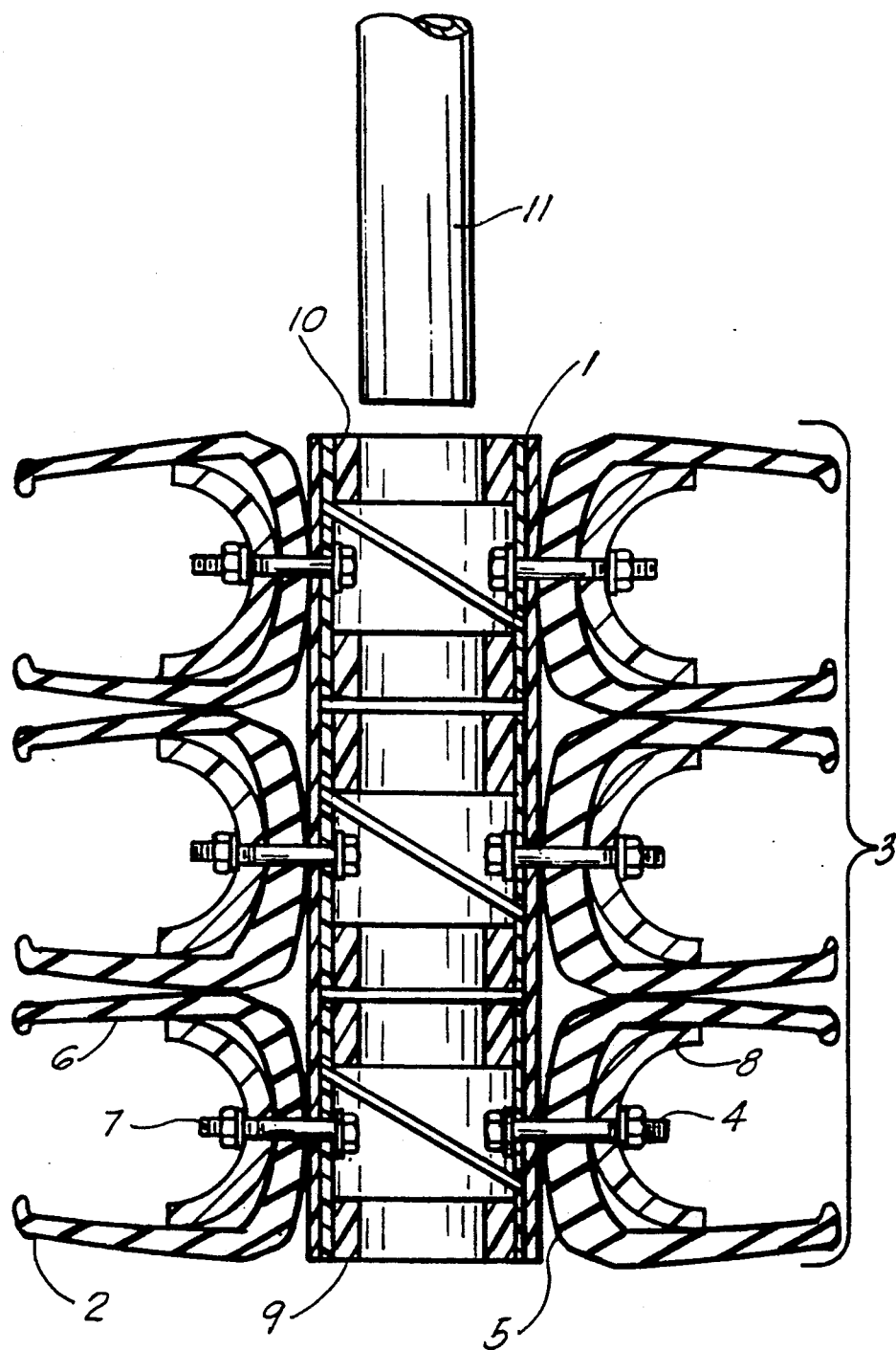
FIG. 8 is a partially cutaway view of an exemplary, preferred tire/pile interlock connector of the present invention, as implemented in conjunction with a set of tires and a supportive pile.

As can be seen in FIG. 8, a component of the hydrodynamic control system of the preferred, exemplary embodiment of the present invention is a vertically aligned, door-hinge-like, support connector 1 for maintaining, for example, six, exemplary, used, vehicular tires 2 (cross-sections of the end portions only of six tire sections being shown) in two, vertical, stacked pairs 3, to be anchored by a concentrically enclosed, pile structure 11 to be embedded into the ground.

The outer peripheral, tread walls of the tires 5 of opposing sets of the tires 2 are each affixed at areas 4 to one of the two dynamic support section 9 or 10, depending upon the tire, which in turn will be in hinge-like communication with the pile 11. The dynamic support sections 9 & 10 are interdigitated together to form a door-hinge-like inter-connector, which when a tire barrier is fully assembled and anchored, allows some, limited rotation of the adjacent tire columns about the anchoring pile, typically of a few degrees, up to about five (5°) degrees. The limited degree of rotation depends on a number of factors, including the amount of hydrodynamic forces involved, the flexibility of the tires, etc.

The tires are affixed to the hinge support sections 9 or 10 via horizontally disposed, laterally extending, threaded nut and bolt arrangements 7. A curved spacer 8, configured to maintain the adjacent, inner wall of each of the tires 6 in a generally radial, open configuration, is located within each tire, interposed between the nut and the inner wall 6 of each tire 2.

Figure 9A:
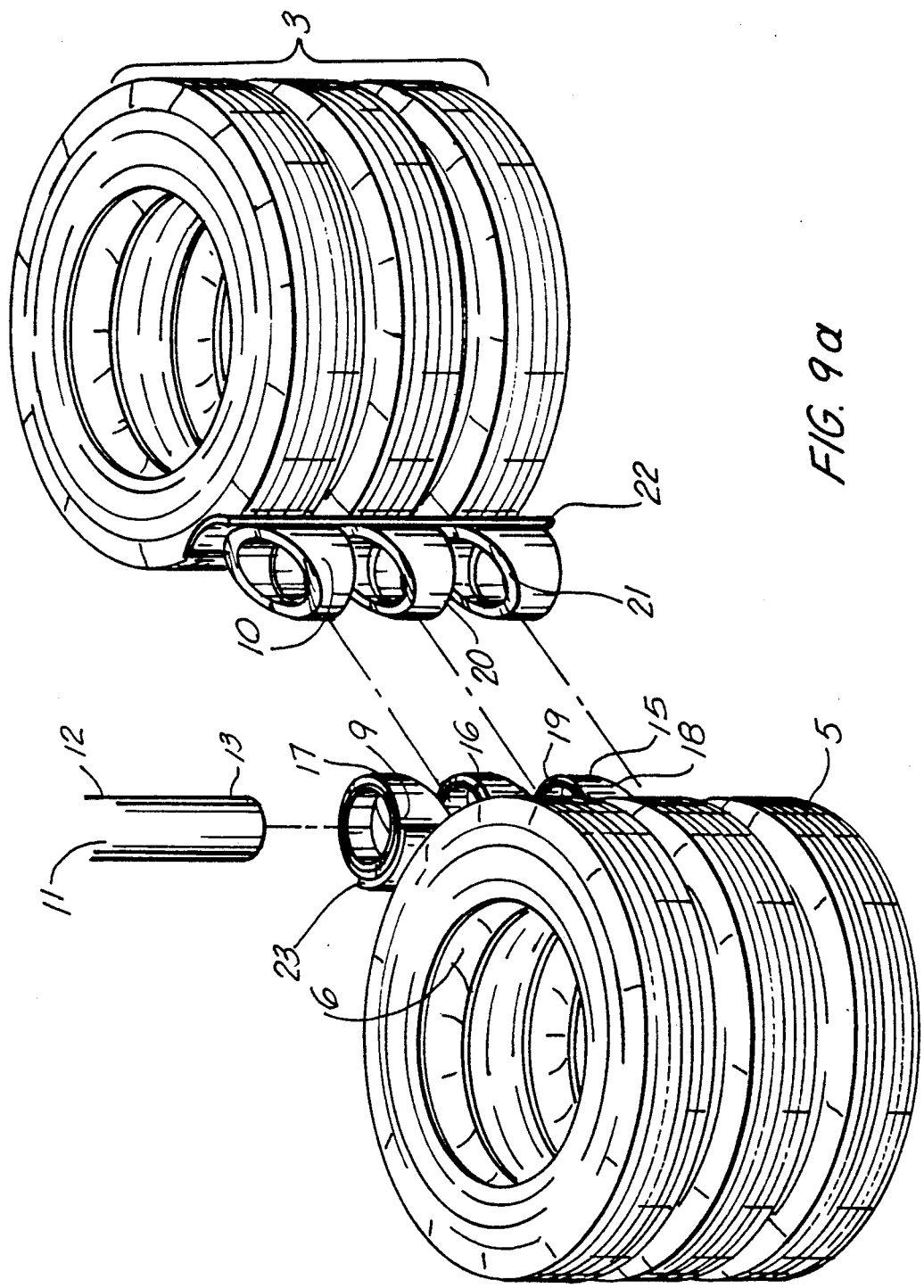
FIGS. 9a & 9b are perspective, exploded and assembled views, respectively, of the hinge-like, tire/pile interlock connector of the present invention, as implemented between interfacing sets of two tire columns, the rest of the tire barrier not being illustrated for simplicity purposes and with the anchoring pile in the ground being shown in phantom line.
Figure 9B:
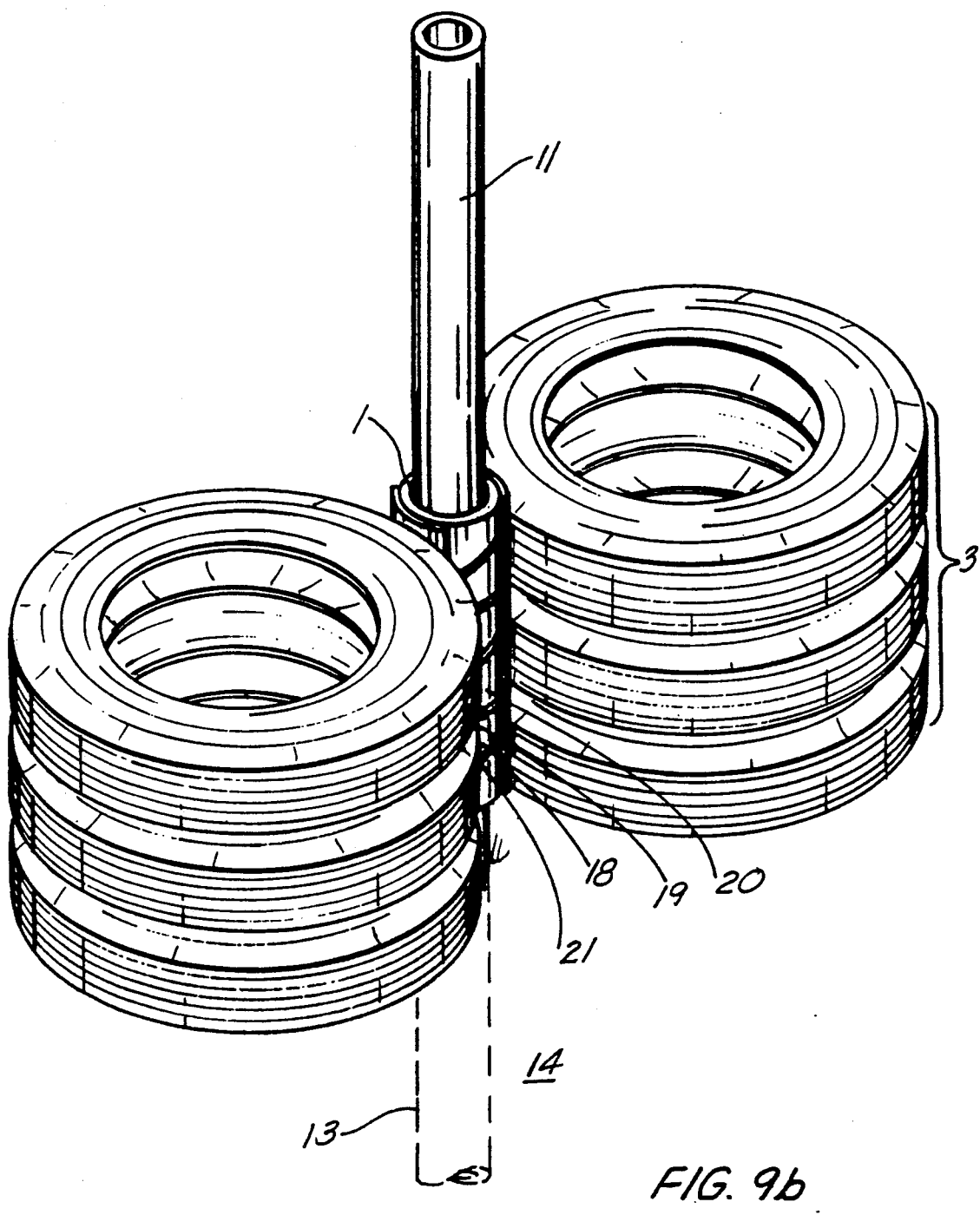

As shown in FIGS. 9a & 9b, the vertical, hinge-like, support connection 1 further comprises multiple, stacked tire rows 3, forming first and second stacked pairs, the first vertical stack of tires being affixed to the first dynamic support section 9, while the second vertical stack is affixed to the dynamic support section 10.

As shown, the first (9) and second (10) dynamic support sections each include radial contact/connection faces 23, 22, each face having emanating from its radial, open side hinge connector sections 15, 16 & 17, respectively, with each dynamic support connector section being configured to slidingly and rotationally envelope or surround the peripheral walls of the concentric pile 11.

The interdigitating hinge connector sections of the first dynamic support section 9 have lower, acute angled side faces 18 on their lower sides and upper, horizontal faces 19 on their upper sides, while the hinge connector sections of the second dynamic support section 10 have lower, horizontal faces 20 on their lower sides and upper, acute angle faces 21 on their upper sides. This alternating, angularity of the dynamic connection between interdigitating, dynamic support sections 9 & 10 is unlike the typical door hinge, which has all parallel sections and faces with all horizontal, parallel angles. An exemplary angle for the acute, angled faces 18, 21 is forty-five (45°) degrees.

The horizontal and acute angled sections of the connectors are configured to slidingly intermesh or interdigitate so that the acutely angled portions 18, 21 and the horizontally angled portions 19, 20 communicate in a pivotal or rotational fashion. The connection, while pivotally engaged to pile 11, is in turn anchored to the ground 14 at base 13.

Figure 10:
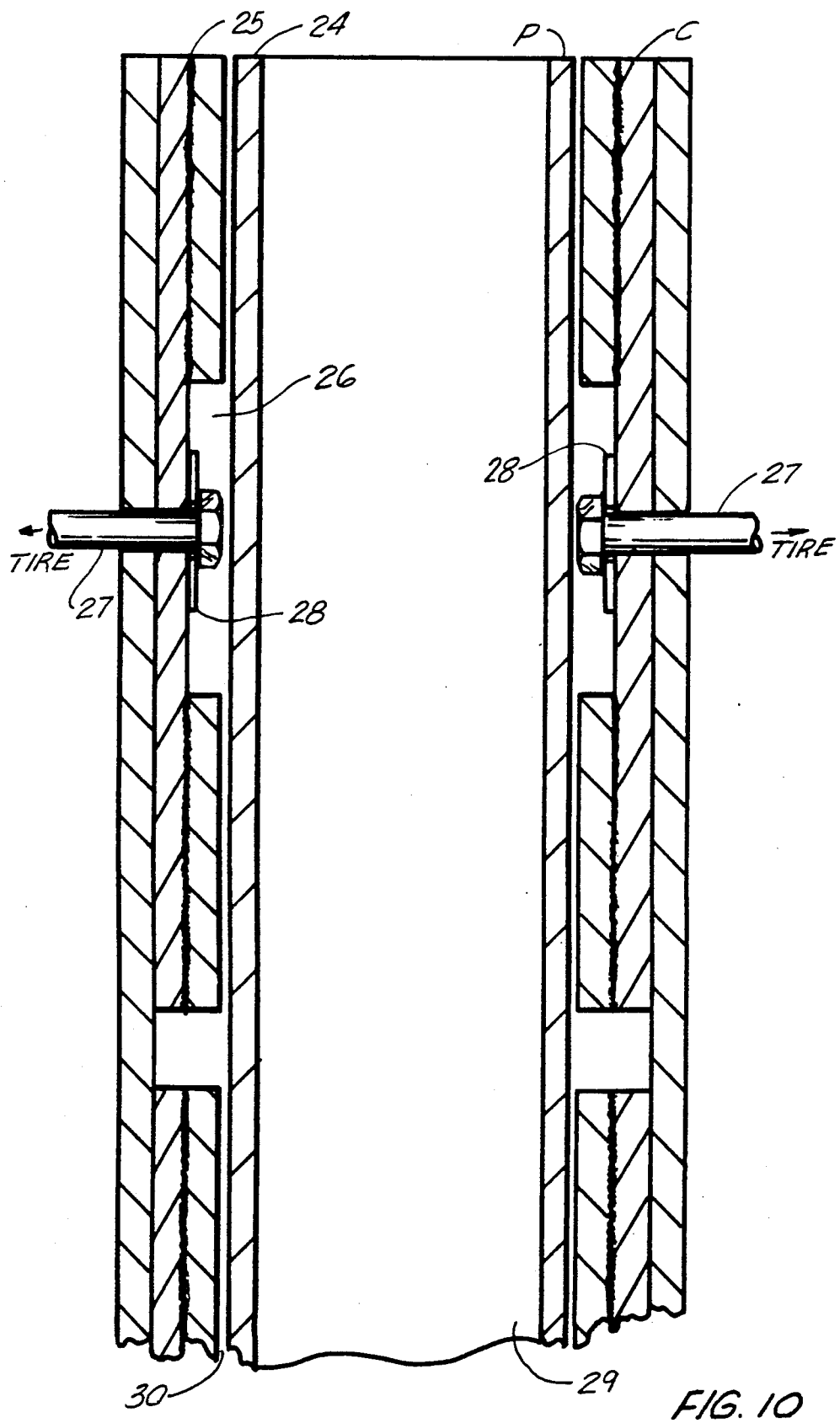
FIG. 10 is a partially cross sectional, partially cutaway, detail view of the tire/pile interlock connector of FIG. 8, illustrating the various components of the connector as implemented about a supportive pile.

As shown in FIG. 10, the first (9) and second (10) dynamic support sections further include concentric sleeves 24 juxtaposed to the inner wall of the supports and pile 29, 11 and adhesively or weldingly affixed at areas 25 to the inner wall, forming a space 26 configured to provide room for bolt 27 and washer 28, while allowing some clearance 30 for the connector to pivot about the pile 11. The bolts 27 affixed the tires to the dynamic support sections, as shown in FIGS. 9a & 9b.

Figure 7A:
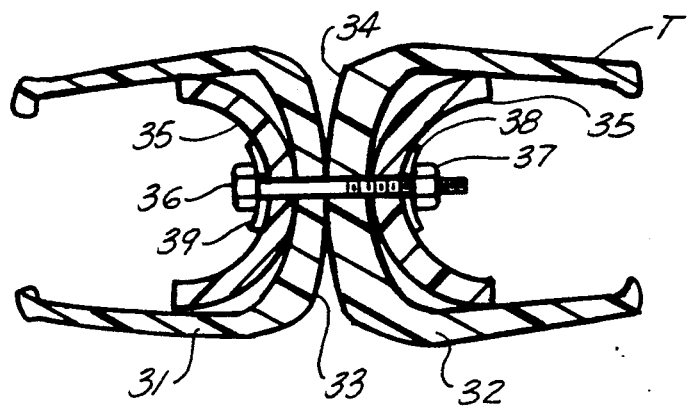
FIG. 7a is a partially cutaway, partially cross-sectional view of an exemplary horizontal connection subsystem which may be utilized in conjunction with the present invention to join adjacent waste tires together.

FIG. 7a illustrates another, alternative component of the present invention, wherein the tires 2 are directly affixed to one another at their opposing, tread faces 33, 34, with the tread faces being in direct contact with one another (as opposed to using the centrally located connector 1.

As shown, the first (31) and second (32), directly opposed tires each have an aperture provided through their tread faces 33, 34 so that a horizontally disposed, laterally extending bolt 36 may be passed therethrough. Next, there are provided curved spacers 35 (substantially identical to the spacer 8 of FIG. 8), which maintain the inner walls of the tires 31, 32 in an open disposition, preventing the tires from collapsing. Finally, the tires are affixed via a threaded interlock using bolt 36 and nut 37, there also being provided spacers or washers 39, 38 juxtaposed therebetween.

Figure 7B:
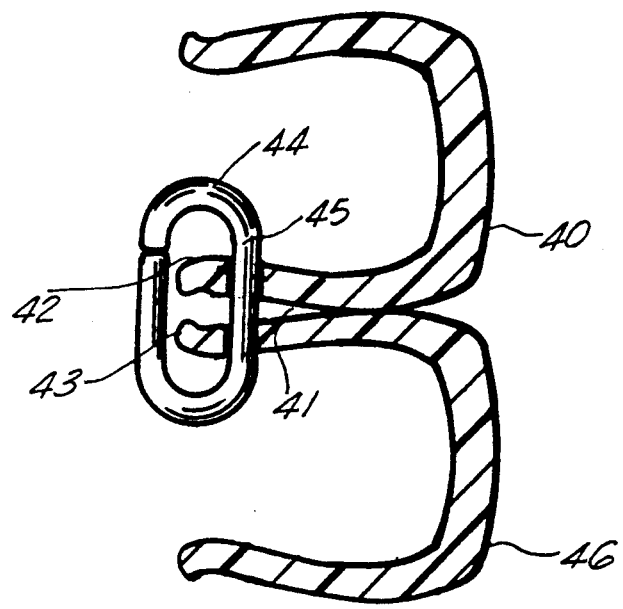
FIG. 7b is a partially cutaway view of a vertical connection apparatus which may be utilized in conjunction with the present invention to join adjacent waste tires together.

FIG. 7b illustrates an exemplary method of affixing the inner peripheral edges of the directly opposed, interfacing, side walls 41 of the vertically stacked tires 40, 46 to one another, maintaining the inner wall of the tires in an open disposition without the need for the spacer or spreader 35 of FIG. 7a. As shown, there are provided aligned apertures 45 in the side wall portions of the tire near each of the tire's periphery, configured so as to accept a chain link 44 through it. The chain link 44 affixes the tire 46 to the tire 40 and clasps the inner tire side walls 41 so that tire side wall end 42 fixedly communicates with and is attached to the tire side wall end 43.

Figures 1A, 1B:
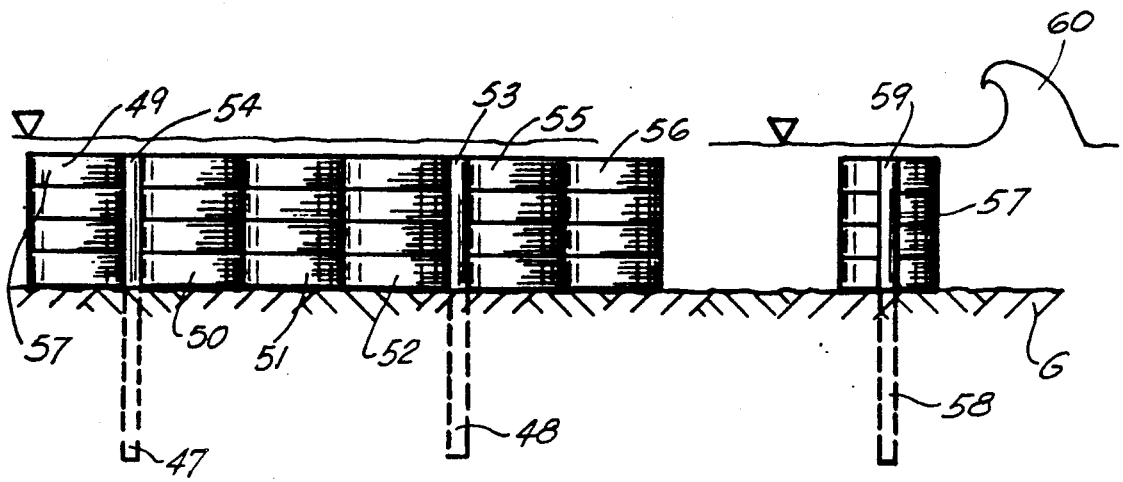
FIGS. 1a, 1b and 1c are front, side and isometric, partially cutaway views, respectively, of a first, exemplary, preferred embodiment of the hydrodynamic control system of the present invention, illustrating a configuration of the present invention designed to reduce the height of low wave action, preventing erosion and related damage.
Figure 1C:
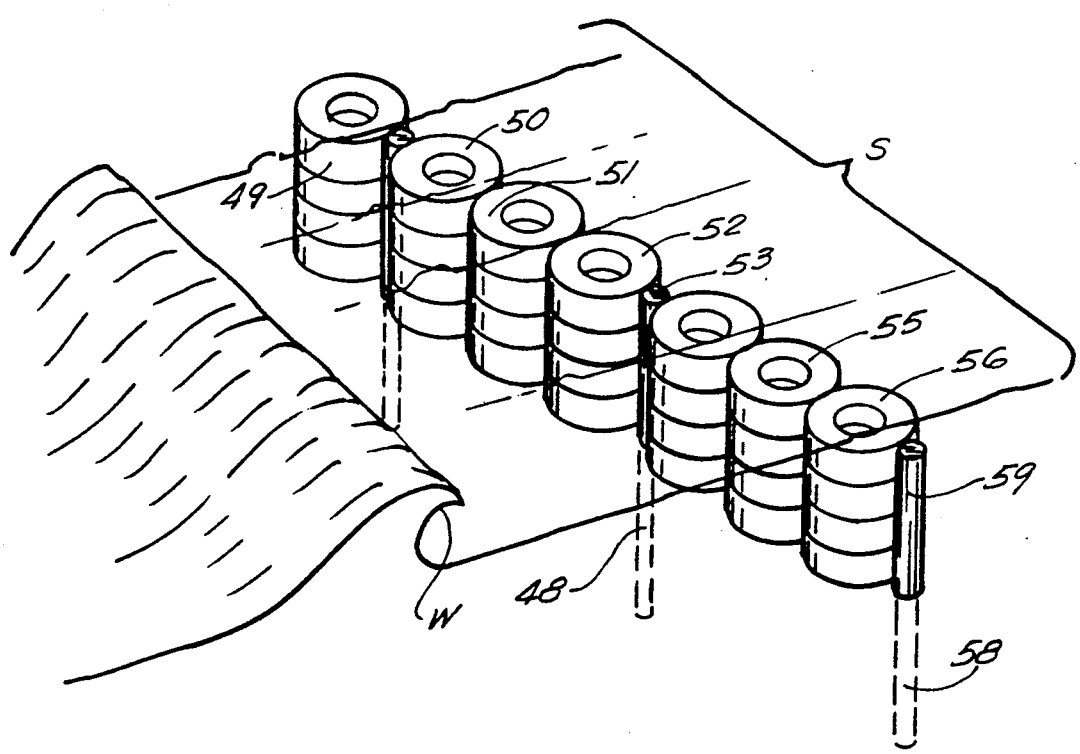

FIGS. 1a–1c illustrate an initial, exemplary embodiment of the present invention wherein there is provided a structural configuration of tires, utilizing the vertical supportive connections of the present invention, for forming columns of tires in configuration for reducing the height of low wave action.

As shown, first (47) and second (48) driven pile having vertical supportive connections 54, 53, respectively, anchor and support tires stacks 49, 50, 51, 52, 55, 56. Further support at the end stack 57 is provided via driven pile 58 and its associated vertical support connection 59. The vertical support connections 59, 53, 54 are affixed to their respective tire stacks in the manner taught in FIGS. 8-10, while the directly opposed tires of the adjacent stacks 50/51, 51/52 and 55/56, 56/57 are affixed to one another through their tread faces in the manner shown in and discussed in connection with FIG. 7a, supra. Further, the vertically spaced, facing, directly opposed sidewalls of the tires of all of the stacks 49-57 are affixed to the one next to it in the vertical stack at their ends utilizing the chain link approach illustrated in FIG. 7b, also discussed supra.

Returning to FIGS. 1a–c, structure S is placed so that it is fully submerged, with the top of the structure being located at the water surface. The incoming wave W impacts the submerged structure, and the wave height is reduced through partial reflection and being scattering off of the rounded forward faces of the barrier, by dissipation through wave breaking and by the structural flexibility of the tires and the limited rotation of the stacks about the piles in partially absorbing the wave force. The structure S is stabilized by the piles 47, 48 & 58 placed into the water body bottom sediments.

The pile spacing, diameter, length, area moment of inertia and material used for the structure S would depend upon local soil conditions and intensity of the expected wave action.

Figure 2A:
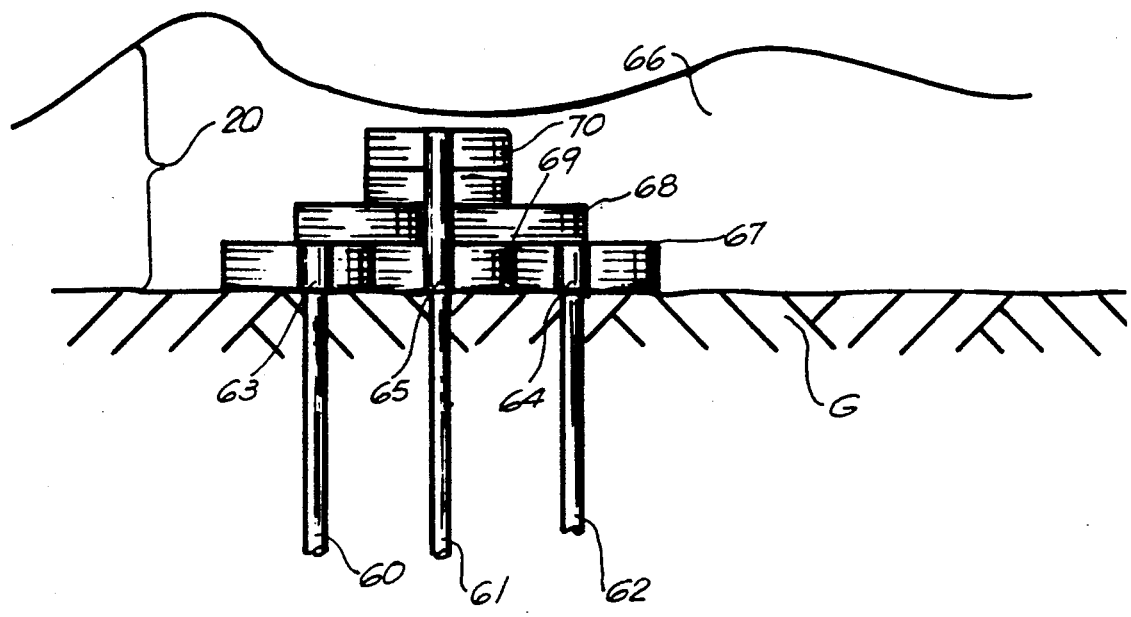
FIGS. 2a and 2b are side and isometric, partially cutaway views, respectively, of a second, alternate embodiment of the hydrodynamic control system of the invention, illustrating an alternative configuration designed to reduce the height of moderate wave action, reducing wave impact forces.
Figure 2B:
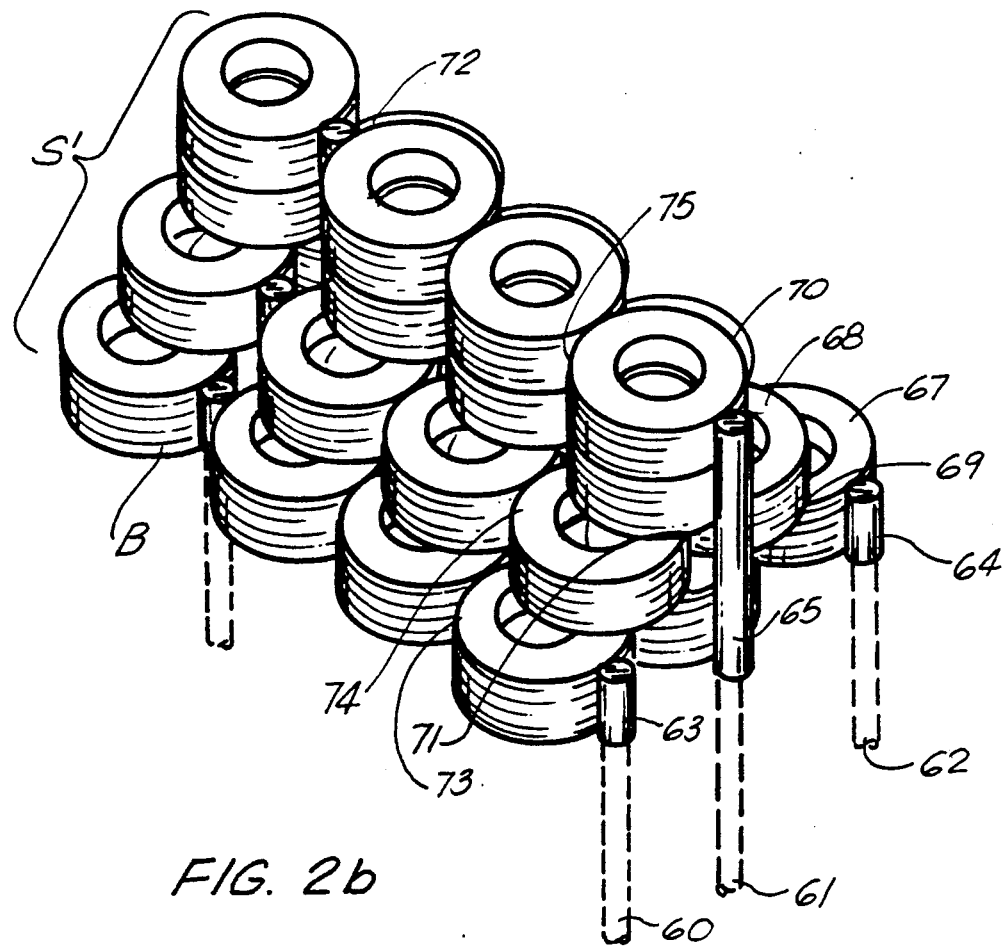

FIGS. 2a and 2b illustrate an embodiment of the present invention suitable for reducing the height of waves of moderate height. As shown, the structure S' is supported and anchored into the ground G via sets of piles 63, 65 & 64 via their embedded driving portions 60, 61 & 62, respectively, having been driven into the ground. Like sets of piles are included between, for example, every third and fourth tire stacks along the width of the structure S', as well as at the far end of the structure.

The staggered structure S' is generally pyramidal shaped in profile and of a suitable length, depending upon the area being protected and particular environmental variables, including the intensity of wave action W, and stability of protected area, and of a lesser height than the water depth 66. It has an open and sloping forward face, which accomplishes two objectives—it increases the amount of wave dissipation due to turbulence generation and it reduces wave impact forces.

Because of the increased wave height it is meant to resist, the base B of the structure S' is broadened to provide more stability and for more effective uses of the piles.

The staggered overlap from one level 67, 78 & 70 to the next level of tires up is about fifty (50%) percent. The tires of each level, for example, 67/68 or 68/70, are vertically affixed, with the top of the sidewall of the lower level tire being affixed to the bottom of the sidewall of the upper level tire via the vertical end tire connection 69, using the sidewall/chain-line approach of vertically affixing the tires illustrated in FIG. 7b and discussed supra.

Returning to FIGS. 2a & 2b, piles 63, 64 & 65 are of suitable material and size to provide stability, as required by a foundation analysis using conventional soil mechanics principles, and should be repeated (note 72) at least every three vertical rows or stacks of tires. Each vertical row of tires is affixed to the adjoining row via their directly opposing tread faces of the adjoining tire sets 73, 74 & 75, as discussed supra in connection with FIGS. 7a.

FIG. 3 shows a side, profile view of an alternative, exemplary embodiment of the present invention configured to reduce the height of high wave (W) action. The structure S" has one tire T of over-lapping, staggered or stepped tires 83, 84, 85, 86, 87, 88 & 89, each being affixed to connector 90 to a side, support bar. The side bar is positioned and supported to form a steeply sloped, angled support member 80, that is anchored and supported by a pair of piles, one being vertical 76 and the other being a batter pile 77.

The support member 80 is affixed at points 81, 82 to the first set of piles 76 & 77, and a like support member (not seen in the drawing but substantially identical to 80) is attached to the opposing sides of the tires and connected to a like, second set of piles (not seen in the drawing but substantially identical to 76 & 77), the overall design being configured to resist wave forces W.

The vertical, staggered, overlap of the tires comprising the tier T is about twenty-five (25%) percent and is configured to provide and distribute the horizontal area of interaction of the tires with the large waves over a greater area, as opposed to the earlier discussed embodiments, as the wave transfers energy to the tires in the form of tire movement as allowed by their mountings 90 (if any) and their flexing with respect to one another, dissipating energy in such motion.

The batter pile 77 preferably is positioned at an angle of between about thirty degrees to about sixty degrees (~30°-~60°) relative to the water bottom or ground G.

Additionally and primarily, the overlap creates vertically exposed openings on the face of the structure, through which the water flows for dissipation of the primarily horizontal wave particle velocity and an increase in the magnitude of the surface turbulence dissipation of the wave energy. If desired, a second layer of tires to form individual stacks or columns, each two tires deep, could be used to increase the rigidity of the structure to handle relatively extreme wave action.

Figure 4A:
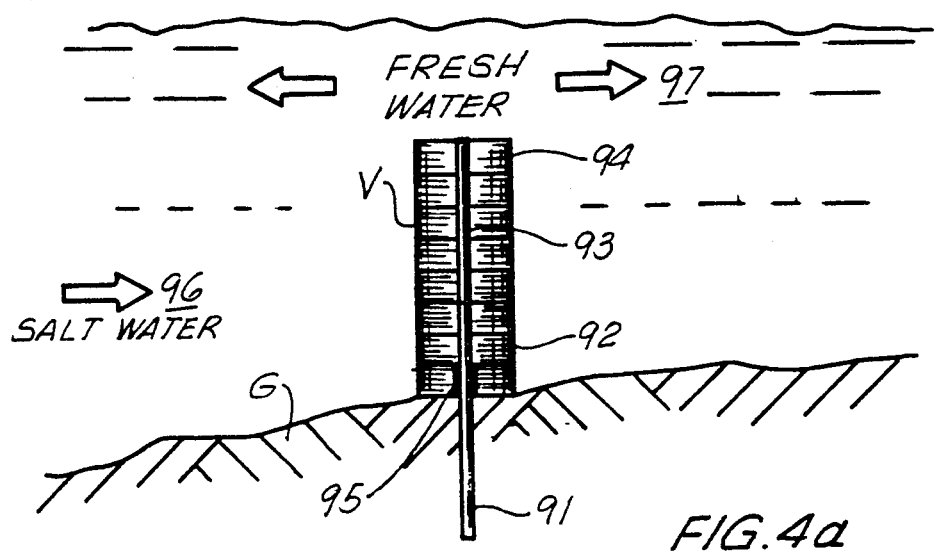
FIG. 4a is a side, partially cutaway view of still another, alternate embodiment of the hydrodynamic control system of the invention, similar to that of FIG. 1, but configured to dissipate the intrusion of saltwater into a channel.
Figure 4B:
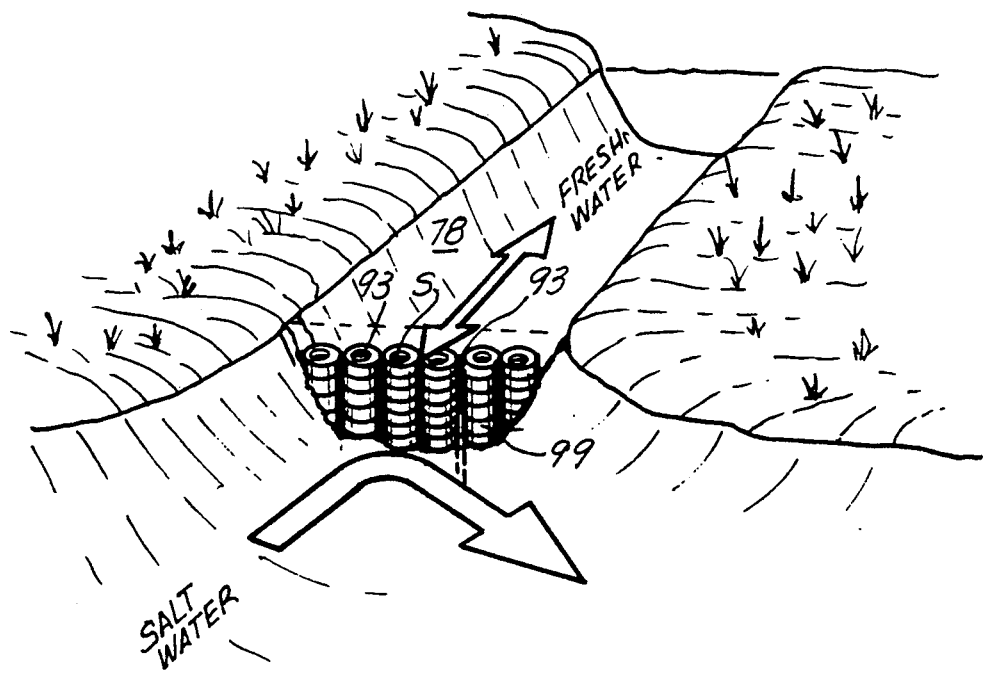
FIG. 4b is an isometric view of the alternate embodiment of the hydrodynamic control system of FIG. 4, illustrating the implementation of the system in the channel and the effects associated therewith.

FIGS. 4a and 4b illustrate still another alternative embodiment of the present invention, wherein vertical, side-by-side columns or stacks V of tires 92 are combined to form a barrier to prevent salt water intrusion into, for example, a canal 98 of fresh or brackish water in, for example, a marsh.

As shown, the structure S" is of lesser height than the depth of the water. Because the salt water 96 is of greater density than the fresh water 97 and thereby forms the lower strata of a combination of fresh and salt water, the barrier S" will prevent intrusion of the salt water layer up to the height of the structure.

The vertical stacks V of tires are affixed to one another in the manners discussed and illustrated regarding FIGS. 7a and 7b, anchored to the ground G via pile 91, and affixed to the pile through a connection 95, which may be flexible. Connection 95 communicates with the inner rim of the bottom tire in the stack, anchoring it and the rest of the stack in place.

Aligned with the vertical axis in exterior communication with the tires forming the stack 92 is a stiffener 93, comprising, for example, a polyurethane tube or the like, and configured to provide flexible, supplemental support for the stack. Buoyancy 94 is provided in the upper tier of the stack for maintaining same in a somewhat vertical disposition, which may take the form of, for example, inner-tube or closed-cell foam members.

The present system is configured to provide a flexible dam system 99 in the form of a strong, dynamic curtain, which will not damage small boats or be damaged, should there be a collision between the two.

The present invention may be also utilized in the manner illustrated in FIG. 12, wherein there is illustrated utilization of the flexible dam system (99) encircled about a shell dredge, for preventing the migration of sediment from a minor body of water B to a major body of water B', thereby protecting, for example, a sensative bottom habitat. As illustrated, the dam system D utilizes the same constructive elements in the form as contemplated in FIGS. 7a and 7b, and may also incorporate bouyancy, such as for example, closed cell foam members or the like, if desired, in the upper tier of the dam.

Further, the flexibility of the structure allows it to absorb wave forces and minimize any negative impact on boat traffic. The structure can be moved to various locations in the channel, as tide and fresh water discharge change the location of the toe of the salt water wedge.

Figure 5:
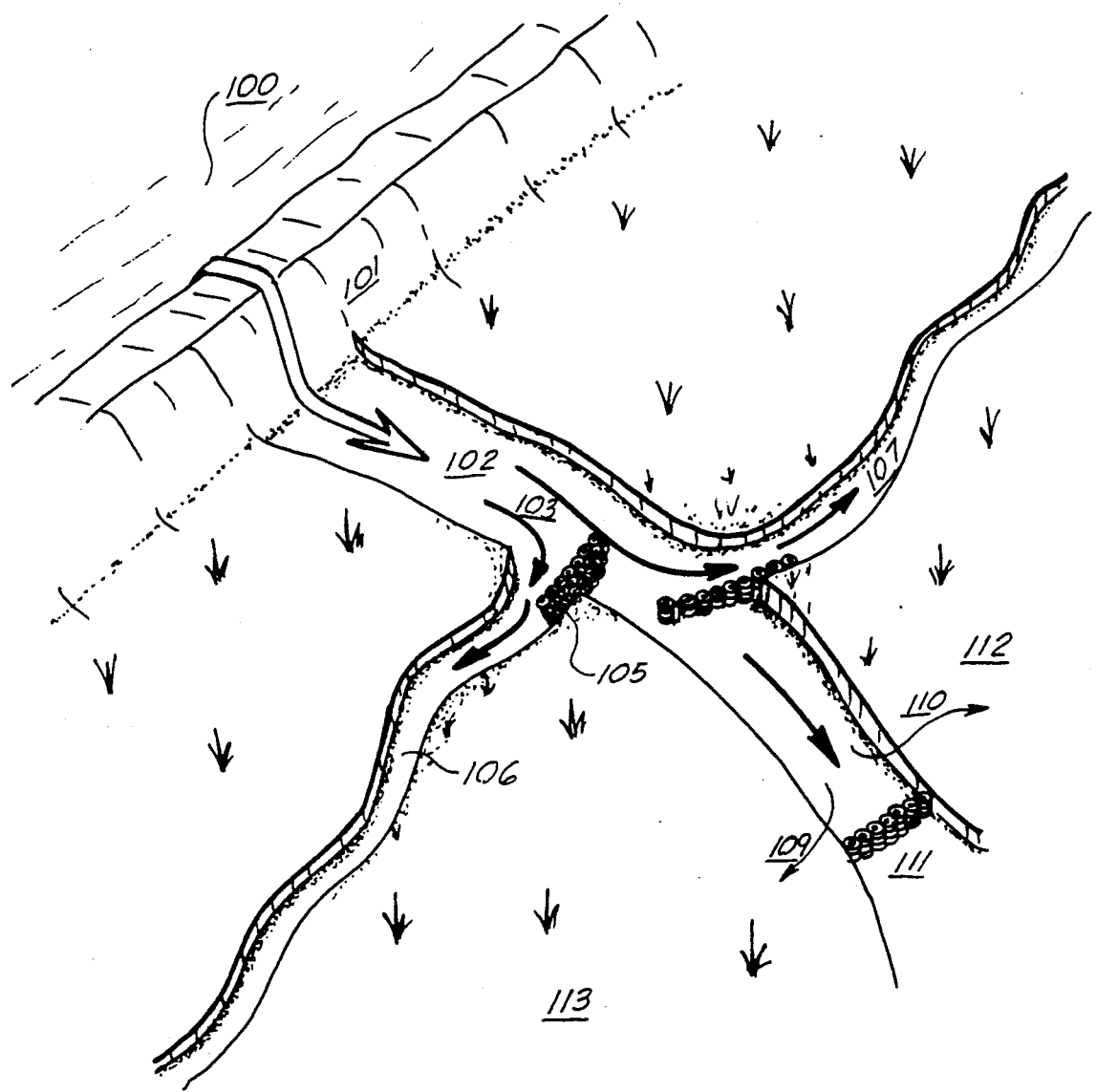
FIG. 5 is an isometric view of the implementation of a series of embodiments of the hydrodynamic control system of FIG. 4, illustrating the system used in a fresh water diversion control capacity, so as to divert the incoming freshwater from the channels eventually to the marsh itself.

FIG. 5 illustrates still another alternative embodiment of the present invention, configured for redirecting the direction or path of fresh water from a body of water such as a river 100, and diverted over a levee 101 or other obstacle through a main channel diversion system 102, and into wetland areas 112, 113.

Typically water that is diverted into the wetlands would flow along main channels 102, where the resistance is least, thus eliminating much of the effectiveness of a diversion project. The structure of the present invention comprises multiple stacks of tires formed in the manner discussed in connection with FIGS. 1a-c, causing water to be diverted from the main channel 102 into smaller channels 106, 107 and into the marsh wetlands 112, 113.

The diverting structures 105, 121 are in the shape of a curved curtain or wall, with the top line of tires slightly above the water surface. The permeability of the wall can be adjusted by removing tires in the wall. The structures could be moved to allow water to be controlled at several points along a channel and thus impact a large area of surrounding marsh.

As shown, a portion 103 of the main flow in the channel 102 is diverted to a minor canal 106 via the barrier structure 105, while another portion 104 is diverted to minor canal 107 via the barrier structure 121. Much of the remaining portion of the remaining flow 108 is diverted 109, 110 to respective marsh areas 113, 112 by an end barrier structure 111.

Figure 6:
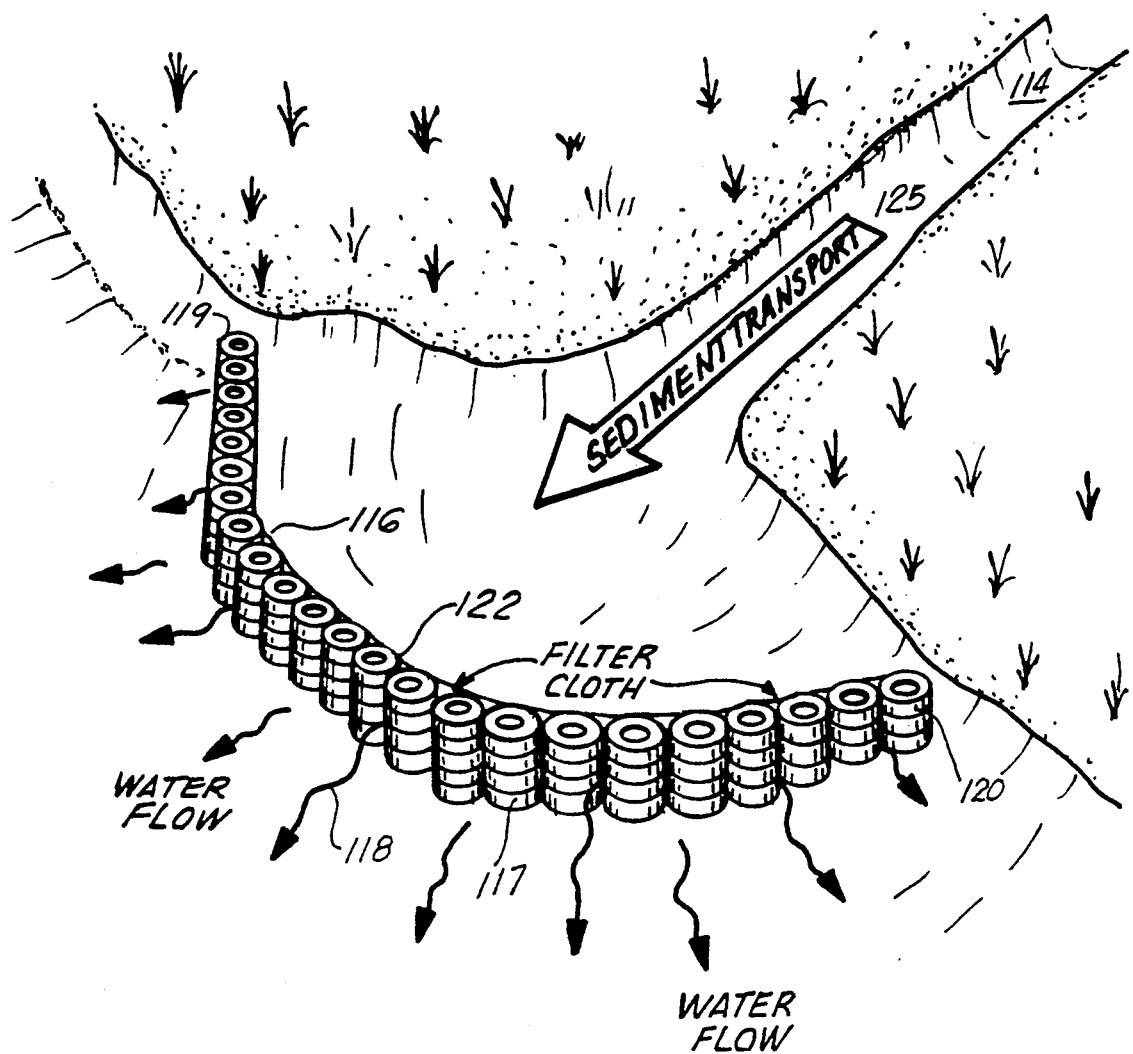
FIG. 6 is a perspective view of still another alternative embodiment of the hydrodynamic control system of the invention, also similar to the embodiment of FIG. 1, but illustrating a design configured to prevent the extrusion of alluvium and the like from the marsh, and in which filter cloth is implemented for capturing the alluvium prior to its egress from the canal.

FIG. 6 illustrates another, final, exemplary embodiment of the present invention, wherein there is provided multiple, vertical, juxtaposed stacks of tires structurally formed and connected together as illustrated in and discussed in connection with FIG. 1a–c, supra, installed to form a fluid permeable barrier wall 117 at the end of canal 114. The canal facing side of the barrier wall further includes a barrier layer of filter cloth 116 provided along the interior wall 122 of the structure so as to prevent the migration of sediment 125 from the marsh canal 114 or the like.

The barrier wall 117 has two ends 119, 120 spanning and permeably closing off the opening of the canal 114, and is designed to allow the water flow 118 passing through the wall to be relatively free of sediment, the sediment being trapped by the filter cloth 116. The filter cloth can be, for example, fluid permiable geofabric, cheesecloth, or the like, and can be removed, and replaced or cleaned as the sediment builds up to a near clogging level in the interstices of the cloth.

Sufficient piling (not illustrated in this figure) are included to appropriately anchor the barrier wall 117 to the water bottom and can be in the forms provided in connection with the embodiments of FIGS. 1a–c, 2a–b and/or 4a–b.

The barrier embodiments of FIGS. 1a–c and 2a–b can be made up of tire stack modules, such as the "3×3" module embodiments (i.e., three tires by three tires) illustrated in FIGS. 11A & 11B, manufactured off-site and thereafter brought to the site and there assembled with other like modules and individual elements (as needed) to form the various needed barriers.

In the first, exemplary module embodiment of FIG. 11A, the left most stack V1 of tires is connected to the directly opposed tires of the central stack V2 through their tread faces in the manner of FIG. 7A, while the right most stack V3 of tires is connected to the directly opposed tires of the central stack V2 through the hinge-like connectors illustrated in FIGS. 8–10.

In the second, exemplary module embodiment of FIG. 11B, both the left most stack V1' of tires and the right most stack V3' of tires is connected to the directly opposed tires of the central stack V2' through their tread faces in the manner of FIG. 7A, while the outboard ends of the left and right most stacks V1' & V3' include opposite parts or sections (9, 20) of the hinge-like connectors illustrated in FIGS. 8–10.

In both embodiments each of the tires of each of the stacks can be joined to the adjacent tire(s) of its respective vertical stack at their opposed sidewalls in the manner of FIG. 7b.

It should be noted that the terms "vertical" and "horizontal" as used herein are not necessarily to be taken literally but rather in their relative sense. Thus, for example, the tire stacks 49–57 of the embodiment of FIGS. 1a–c can be described as "vertical" stacks, with the individual tires being "horizontally" disposed (i.e. lying down), although of course the water bottom could in fact be inclined from the horizontal, in which instance "vertical" can be taken to mean "orthogonal" (to the water bottom) and "horizontal" to mean "parallel" to the water bottom; although, of course, if so desired, the tire barriers could be mounted so that they are truly vertical, although at an angle to an inclined water bottom.

Exemplary specifications are presented below:

Tires 2—any full, round, undamaged vehicular tire; tires of generally the same wheel size should be used in a single structure.

Spacers 8/35—4"–8" PVC, HDPE, or other suitable non-corrosive pipe material; wall thickness to vary with the embodiment or application;

Bolt 36 and nut 37—2" stainless steel bolts; nominal diameter 5/16", but size may vary with embodiment dependent upon application;

Washer 38—one and a half (1½") inch stainless steel fender washer, but size may vary dependent upon embodiment and application; and Line 44—although described as a chain link, may be comprised of stainless steel wire, nylon cable warp, or other suitable, preferably closed-loop-type fastener.

The embodiments described herein in detail for exemplary purposes are of course subject to many different variations in structure, design, dimension, application and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

What is claimed is:

1. A hydrodynamic control system for diminishing water damage or diverting water, the hydrodynamic control system being implemented in a body of water in communication with the ground, comprising:

at least two stacks, a first and a second stack, of tires, each tire of said stacks being horizontally disposed and having an inner, radially curved wall, sidewalls, and a tread face, the tires of each stack being stacked one on top of the other in sidewall-to-sidewall fashion with the adjacent tires of its respective stack;

anchor means for anchoring said stacks to the ground; and a vertically disposed, supportive, dynamic connection located between said two stacks of tires and communicating in substantially longitudinal fashion with and between said stacks, said vertical supportive connection including— a longitudinally extended support member communicating with said anchor means, a first dynamic support member affixed to said first stack of tires, a second dynamic support member affixed to said second stack of tires and interdigitated with said first dynamic support member, said first and second dynamic support members in combination forming a longitudinally extended passage between them having inner walls, said longitudinal support member communicating with and being located within said inner walls of said first and second dynamic support members, allowing said first and second dynamic support members to at least partially rotate about said longitudinal support member.

2. The hydrodynamic control system of claim 1, wherein:

said first and second, interdigitated dynamic support members include longitudinally spaced, interdigitated, facing wall sets, the adjacent ones of which form an acute angle with respect to one another.

3. The hydrodynamic control system of claim 2, wherein:

there are at least four of said interdigitated, facing wall sets—
one set being substantially horizontally disposed,
the next adjacent set, termed the second set, being at an acute angle with respect to said one set,
the next adjacent set, termed the third set, being substantially horizontally disposed and substantially parallel to said one set, with said second set being at an acute angle with respect to said third set, and
the next adjacent set, termed the fourth set, being at an acute angle with respect to said third set.

4. The hydrodynamic control system of claim 3, wherein:

said second set of said interdigitated, facing wall sets is substantially horizontal and substantially parallel to said fourth set.

5. The hydrodynamic control system of claim 1, wherein:

said first and second, interdigitated dynamic support members form in combination a door-hinge-like structure having a substantially closed, cylinder-like configuration, with said longitudinally extended support member being concentrically contained within said cylinder-like structure providing a hinge-pin-like element.

6. The hydrodynamic control system of claim 1, wherein:

said door-hinge-like structure has non-parallel, adjacent, interfacing sections.

7. The hydrodynamic control system of claim 1, wherein there is further included:

spacers within the tires maintaining said inner, radially curved walls of said tires in open, non-collapsed dispositions.

8. The hydrodynamic control system of claim 1, wherein:

each of said spacers is a curved member secured to its respective tire by the same fastener used to fasten the tire to its respective dynamic support member.

9. The hydrodynamic control system of claim 1, wherein there is further included:

a third vertical stack of tires, each tire of said third stack being horizontally disposed and having an inner, radially curved wall, sidewalls, and a tread face, the tires of said third stack being located in-line with and attached to at least one of said first and second stacks and being opposed in tread face to tread face fashion with the adjacent tires of at least one of said first and second stacks.

10. The hydrodynamic control system of claim 9, wherein:

the tires of said third vertical stack include at least two tires, with each tire of the stack being directly connected to its immediately adjacent tire in the stack at their facing sidewalls by means of a sidewall-to-sidewall connector.

11. The hydrodynamic control system of claim 10, wherein said sidewall-to-sidewall connector comprises:

a metal, loop connector extending through facing apertures through the adjacent sidewalls located close to the ends of the sidewalls, with the loop connectors extending also through the central, open areas of the adjacent tires.

12. The hydrodynamic control system of claim 10, wherein:

the interconnection between said third stack and said first and second stacks includes for each tire in said third stack two opposed, mechanical connectors extending through its tread face to opposed tires in at least one of said first and second stacks.

13. The hydrodynamic control system of claim 9, wherein:

the interconnection between said third stack and said first and second stacks includes for each tire in said third stack two opposed, mechanical connectors extending through its tread face, one to and through the tread face of an opposed tire in said first stack and the other to and through the tread face of an opposed tire in said second stack.

14. The hydrodynamic control system of claim 1, wherein:

the partial rotation of said first and second dynamic support members about said longitudinal support member is about five (~5°) degrees.

15. The hydrodynamic control system of claim 1, wherein said anchor means and said longitudinal support member in combination comprise:

a pile driven into the ground.

16. A tire module for connection to one or more other like modules for combined use in a hydrodynamic control system for diminishing water damage or diverting water, the hydrodynamic control system being implemented in a body of water in communication with the ground, comprising:

two, vertical, first and second, outboard stacks of tires, each tire of said stacks being horizontally disposed and having an inner, radially curved wall, sidewalls, and a tread face, the tires of each stack being stacked in a sidewall-to-sidewall fashion with the adjacent, vertically arrayed tires of its respective stack;

a third, vertical, centrally located stack of tires, each tire of said third stack being horizontally disposed and having an inner, radially curved wall, sidewalls, and a tread face, the tires of said third stack being located in-line between and interconnected with said first and second stacks and being opposed in tread face to tread face fashion with the adjacent, vertically arrayed tires of said first and second stacks, the tires of said third vertical stack include at least two tires, with each tire of the stack being directly connected to its immediately adjacent tire in the stack at their facing sidewalls by means of a sidewall connector, the interconnection between said third stack and said first and second stacks includes for each tire in said third stack two opposed, mechanical connectors extending through its tread face, one to and through the tread face of an opposed tire in said first stack and the other to a mechanical connection to the tread face of an opposed tire in said second stack; and a first dynamic support member affixed to one of said vertical stacks of tires; and a second, oppositely configured, dynamic support member affixed to another one of said vertical stack of tires;

said first dynamic support member being matable with another, opposed, dynamic support member substantively identical to said second dynamic support member to form in combination to a door-hinge-like structure having a substantially closed, cylinder-like configuration, forming a longitudinally extended passage formed therebetween for interconnection with a pile associated member serving as a hinge-pin-like element for anchoring the modules to the ground while allowing some limited rotation of the adjacent tires about the pile.

17. The hydrodynamic control system of claim 16, wherein:
said first and second dynamic support members are located between said third, central stack and said second, outboard stack and are mated together, connecting said second and said third stacks together.

18. The hydrodynamic control system of claim 16, wherein:
said first and second dynamic support members are located on opposite, outboard ends of said first and said second stacks and mate with oppositely configured dynamic support members on other, separate modules or hydrodynamic control elements; and wherein:
said second and said third stacks are connected together by mechanical connectors extending through tread faces of said tires of said third stack to and through the tread face of an opposed tire in said second stack.

19. The hydrodynamic control system of claim 16, wherein said mechanical connectors include:
threaded nut and bolt assemblies extending through and between opposed tread faces of adjacent stacks, said assemblies also carrying spacers within the opposed tires maintaining said inner, radially curved walls of said tires in open, non-collapsed dispositions.

20. A hydrodynamic control system for diminishing water damage or diverting water, the hydrodynamic control system being implemented in a body of water in communication with the ground, comprising:
at least two vertical stacks, a first and a second stack, of tires, each tire of said vertical stacks being horizontally disposed and having an inner, radially curved wall, sidewalls, and a tread face, the tires of each stack being stacked one on top of the other in aligned, opposed, sidewall-to-sidewall fashion with the adjacent ties of its respective stack sharing a common centerline;
spacers located within the tires maintaining said inner, radially curved wall of said tires in open, non-collapsed dispositions;
anchor means for anchoring said vertical stacks to the ground; and
a vertically disposed, supportive, dynamic connection located between said two stacks of tires and communicating in substantially longitudinal fashion with and between said vertical stacks, said vertical supportive connection including—
a longitudinally extended support member communicating with said anchor means,
a first dynamic support member affixed to said first stack of tires,
a second dynamic support member affixed to said second stack of tires and interdigitated with said first dynamic support member, said first and second dynamic support members in combination forming a longitudinally extended passage between them having inner walls, said longitudinal support member communicating with and being located within said inner walls of said first and second dynamic support members, allowing said first and second dynamic support members to at least partially rotate about said longitudinal support member, said first and second, interdigitated dynamic support members include longitudinally spaced, interdigitated, facing wall sets, the adjacent ones of which form an acute angle with respect to one another, said first and second, interdigitated dynamic support members forming in combination a door-hinge-like structure having a substantially closed, cylinder-like configuration, with said longitudinally extended support member being concentrically contained within said cylinder-like structure providing a hinge-pin-like element, the combination allowing a limited amount of rotation of the order of about five (5°) by the adjacent tire sections about the hinge-pin-like element.

21. The hydrodynamic control system of claim 20, wherein:
each of said spacers is a curved member secured to its respective tire by the same fastener used to fasten the tire to its respective dynamic support member.

22. The hydrodynamic control system of claim 20, wherein there is further included:
a third vertical stack of tires, the tires of said third vertical stack including at least two tires, with each tire of the stack being directly connected to its immediately adjacent tire in the vertical stack at their facing sidewalls by means of a sidewall-to-sidewall connector, there being facing apertures through said facing sidewalls, a metal, loop connector extending through said facing apertures through the adjacent sidewalls located close to the ends of the sidewalls, with the loop connectors extending also through the central, open areas of the adjacent tires, attaching the adjacent tires of said third vertical stack together.

23. A hydrodynamic control system for diminishing water damage or diverting water, said system being formed of a plurality of tires having an inner, radially curved wall having an edge, an open tread face, and sidewalls, said system being implemented in a body of water in communication with the ground, comprising:
a generally pyramidal configured structure formed of a plurality of stacks of vertically staggered tires, said tires communicating at least partially in sidewall-to-sidewall fashion with the adjacent, vertical arrayed tires, said structure further including—
anchor means for anchoring said stacks to the ground; and
vertical supportive connection means communicating in generally longitudinal fashion with said stacks, said vertical supportive connection comprising a longitudinal support member, a dynamic support member longitudinally affixed to a tire stack, said dynamic support member having a longitudinal passage formed therein, wherein inner walls are formed, the longitudinal support member communicating with said inner walls of said dynamic support member, such that said dynamic support member may at least partially rotate about said longitudinal support member, said longitudinal support member communicating with said anchor means.

24. The hydrodynamic control system of claim 23, wherein there is further included:
spacers within said tires maintaining said inner, radially curved wall of said tires in an open fashion.

25. The hydrodynamic control of claim 23, wherein said anchor means comprises:
a pile driven into the ground.

26. A hydrodynamic control system for diminishing water damage or diverting water, said system being formed of a plurality of tires having an inner, radially curved wall having an edge, an open tread face and sidewalls, said system being implemented in a body of water in communication with the ground, comprising:
first and second, substantially vertical, frontal piles emanating from the ground;
first and second, angled, rear, batter piles emanating from the ground;
a first angled, side support member having first and second ends, said first end being affixed to said first frontal pile, said second end being affixed to said first rear, batter pile, forming a first support frame;
a second angled, side support member having first and second ends, said first end being affixed to said second frontal pile, said second end being affixed to said second rear, batter pile, forming a second support frame; and
a plurality of stepped, vertically spaced tires supported between said first and second support frames, said tires each being positioned with said first and second support frames being connected to said open tread faces of said tires.

27. The hydrodynamic control system of claim 26, wherein:
said tires are fixedly connected together in sidewall-to-sidewall, at least partially over-lapping fashion.

28. The hydrodynamic control system of claim 26, wherein:
said first ends of said first and second support frames are submerged under a body of water, and wherein said second ends of said support frames are positioned above the body of water.

29. The hydrodynamic control system of claim 26, wherein:
said batter pile is positioned at an angle of between about thirty degrees to about sixty-degrees (~30°-~60°) relative to the ground.

30. A method of utilizing a hydrodynamic wall structure comprising a plurality of vertical stacks formed of multiple tires vertically juxtaposed in sidewall-to-sidewall manner, in order to prevent the intrusion of salt or brackish water from a first body of water into a second body of fresh water having first and second sides and ground therebetween, comprising the following steps:
(a) providing a plurality of vehicular tires of relatively uniform size;
(b) forming a plurality of vertical tire columns by placing a uniform number of tires in sidewall-to-sidewall disposition, said vertical columns each having a longitudinal cavity therethrough and upper and lower ends;
(c) positioning said vertical columns juxtaposed to the first and second sides, with said vertical columns communicating with one another in longitudinal fashion, forming a wall extending up from the ground;
(d) anchoring said wall to the ground; and
(e) preventing the intrusion of salt water into the fresh water canal, while allowing fresh water to flow out of the canal using said wall of tires.

31. The method of claim 30, wherein there is further included the additional step of:
providing buoyancy means in said upper ends of said vertical columns.

32. The method of claim 30, wherein there is further included the additional step of:
providing anchoring means to said lower ends of said vertical columns.

33. The method of claim 30, wherein there is further included the additional step of:
providing a vertically extending stiffener adjacent to and between two juxtaposed vertical columns, stiffening said wall.

34. The method of claim 33, wherein there is further included the additional step of:
anchoring said stiffener to the ground.

35. A method of utilizing a hydrodynamic wall structure for diverting the flow of water from a major body of water having first and second banks and a water bottom, to a minor body of water, such as a marsh, the hydrodynamic wall structure comprising a plurality of vertical stacks, formed of multiple tires juxtaposed in sidewall-to-sidewall manner, comprising the following steps:
(a) providing a plurality of vehicular tires of relatively uniform size;
(b) forming a plurality of vertical columns, by placing a uniform number of tires in sidewall-to-sidewall disposition, said vertical columns each having a longitudinal cavity therethrough and upper and lower ends;
(c) positioning said vertical columns with said vertical columns communicating with one another in longitudinal fashion, forming a wall having first and second outboard ends, said wall extending up from the water bottom, said wall further being positioned to communicate with one bank of said major body of water, with one of said ends being positioned about one-half to three-quarters across said major body of water, diverting a portion of the flow of said major body of water out of said body; and
(d) anchoring said wall to the water bottom.

36. The method of claim 35, wherein there is further included the additional step of:
(e) providing a second wall formed of said vertical tire columns, said second wall having first and second outboard ends, said second wall also extending up from the water bottom, said second wall being positioned downstream from said first wall, said second wall being positioned juxtaposed to said first and second banks of said major body of water with said first end of said second wall communicating with the first bank of said major body of water, and said second end of said second wall communicating with said other, second bank, diverting a large portion of the flow of said major body of water out of said body.

37. The method of claim 35, wherein there is further included in step "a" the additional step of:
providing anchoring means to said lower ends of said vertical columns.

38. The method of claim 35, wherein there is further included the additional step of:
placing a stiffener adjacent to and between two adjacent vertical columns.

39. The method of claim 38, wherein there is further included the additional step of:
anchoring said stiffener to the water bottom.

40. A method of utilizing a hydrodynamic wall structure comprising a plurality of vertical stacks, formed of multiple tires juxtaposed in sidewall-to-sidewall manner, in order to prevent the extrusion of sediment from a minor body of water to a major body of water, said minor body of water having first and second banks and a water bottom therebetween, comprising the following steps:
   (a) providing a plurality of vehicular tires of relatively uniform size, and a length of fluid permeable filter material having interstices sufficiently small to trap sediment;
   (b) forming a plurality of vertical columns by placing a uniform number of tires in sidewall-to-sidewall disposition, said vertical columns each having a longitudinal cavity therethrough and upper and lower ends;
   (c) positioning said vertical columns juxtaposed to the first and second banks of the minor body of water with said vertical columns communicating with one another in longitudinal fashion, forming a wall extending up from the water bottom, said wall having an inner side facing said minor body of water and an outer side facing said major body of water; and
   (d) anchoring said wall to the water bottom.

41. The method of claim 40, wherein there is further included the additional step of:
   covering at least most of said inner side of said wall with the filter material and fastening it to said wall, trapping the sediment in said filter material, while letting the fluid pass therethrough, preventing the extrusion of the sediment into the major body of water.

42. The method of claim 40, wherein there is further included the additional step of:
   providing buoyancy means in said upper ends of said vertical columns.

43. The method of claim 40, wherein there is further included the additional step of:
   anchoring said lower ends of said vertical columns to the water bottom.

44. The method of claim 40, wherein there is further included the additional step of:
   placing a stiffener adjacent to and between two adjacent vertical columns.

45. The method of claim 44, wherein there is further included the additional step of:
   anchoring said stiffener to the water bottom.

46. The method of claim 40, wherein there is further provided the additional step of:
   placing buoyancy means in said upper ends of said vertical columns.

47. A method of utilizing a hydrodynamic wall structure comprising a plurality of vertical stacks, formed of multiple tires juxtaposed in sidewall-to-sidewall manner, in order to prevent the extrusion of sediment from a minor body of water to a major body of water, said minor body of water having a water bottom, comprising the following steps:
   (a) providing a plurality of vehicular tires of relatively uniform size;
   (b) forming a plurality of vertical columns by placing a uniform number of tires in sidewall-to-sidewall disposition, said vertical columns each having a longitudinal cavity therethrough and upper and lower ends;
   (c) positioning said vertical columns in an arrangement encircling the minor body of water with said vertical columns communicating with one another in longitudinal fashion, forming a wall extending up from the water bottom, said wall having an inner side facing said minor body of water and an outer side facing said major body of water; and
   (d) anchoring said wall to the water bottom.

48. The method of claim 47, wherein there is further included the step of providing a length of fluid permeable filter material having interstices sufficiently small to trap sediment, and positioning said length of fluid permiable to filter material along said inner side of said wall, from the water bottom, to generally near water level.

* * * * *